(12) United States Patent
Waller et al.

(10) Patent No.: US 8,826,387 B2
(45) Date of Patent: Sep. 2, 2014

(54) VALIDATION AND FAST CHANNEL CHANGE FOR BROADCAST SYSTEM

(75) Inventors: Arthur Simon Waller, Middlesex (GB); John Adam, Middlesex (GB)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/273,920

(22) Filed: Oct. 14, 2011

(65) Prior Publication Data

US 2012/0096504 A1 Apr. 19, 2012

(30) Foreign Application Priority Data

Oct. 15, 2010 (GB) .................................. 1017500.8

(51) Int. Cl.
*G06F 21/00* (2013.01)

(52) U.S. Cl.
USPC .............................................. 726/4; 725/110

(58) Field of Classification Search
None
See application file for complete search history.

(56) References Cited

U.S. PATENT DOCUMENTS

| | | | |
|---|---|---|---|
| 2001/0010720 A1* | 8/2001 | Kimball et al. | 380/241 |
| 2001/0011254 A1* | 8/2001 | Clark | 705/59 |
| 2002/0006204 A1* | 1/2002 | England et al. | 380/269 |
| 2002/0010936 A1* | 1/2002 | Adam | 725/91 |
| 2002/0099663 A1* | 7/2002 | Yoshino et al. | 705/65 |
| 2002/0164022 A1* | 11/2002 | Strasser et al. | 380/201 |
| 2002/0166047 A1* | 11/2002 | Kawamoto | 713/169 |
| 2003/0026424 A1 | 2/2003 | McGarrahan et al. | |
| 2003/0051250 A1* | 3/2003 | Sugimoto et al. | 725/95 |
| 2003/0120940 A1* | 6/2003 | Vataja | 713/193 |
| 2004/0181813 A1* | 9/2004 | Ota et al. | 725/131 |
| 2004/0215708 A1* | 10/2004 | Higashi et al. | 709/201 |
| 2005/0283440 A1* | 12/2005 | Saeki et al. | 705/59 |
| 2007/0067244 A1* | 3/2007 | Jin et al. | 705/59 |
| 2007/0201699 A1 | 8/2007 | Kasuya | |
| 2009/0271829 A1 | 10/2009 | Larsson et al. | |
| 2012/0060031 A1* | 3/2012 | Huang et al. | 713/168 |

FOREIGN PATENT DOCUMENTS

| | | |
|---|---|---|
| EP | 2 166 765 A1 | 3/2010 |
| EP | 2378758 A1 | 10/2011 |
| WO | 2007146876 A2 | 12/2007 |
| WO | 2008042953 A1 | 4/2008 |
| WO | WO 2010/093196 A2 | 8/2010 |

OTHER PUBLICATIONS

Communication issued on Jan. 17, 2012 by the European Patent Office in the counterpart European Patent Application No. 11181503.1.

(Continued)

*Primary Examiner* — William Goodchild
(74) *Attorney, Agent, or Firm* — Sughrue Mion, PLLC

(57) ABSTRACT

A method of enabling transmission of a data service from a content server to a terminal using a data channel in a system in which at least part of the data service is transmitted to the terminal using a broadcast channel, the method including: receiving, using the broadcast channel, first data comprising part of the data service; processing the first data using a signature-generating algorithm to derive first signature data; transmitting the first signature data using the data channel to the content server; validating the first signature data by comparing said first signature data with a signature derived by processing data comprising part of the data service using a corresponding signature-generating algorithm; and enabling the terminal to access the data service using the data channel dependent on validation of the first signature data.

22 Claims, 7 Drawing Sheets

(56) References Cited

OTHER PUBLICATIONS

"Fast channel Change for DVB-IP Systems", Draft ETSI TS 10x xxx V<0.0.1>, Technical Specification, May 2009, pp. 1-24.
Communication dated Nov. 9, 2012, issued by the European Patent Office in counterpart European Patent Application No. 11 181 503.1.
"Digital Video Broadcasting (DVB); Transport of MPEG-2 TS Based DVB Services over IP Based Networks" ETSI TS 102 034 V1.4.1 (Aug. 2009), 2009, pp. 1-229, (http://www.etsi.org/deliver/etsi_ts/102000_102099/102034/01.04.01_60/ts_102034v010401p.pdf).
B. Versteeg et al., "Unicast-Based Rapid Acquisition of Multicast RTP Sessions draft-ietf-avt-rapid-acquisition-for-rtp-10", Internet Draft, May 29, 2010, 53 pages, (http://tools.ietf.org/html/draft-ietf-avt-rapid-acquisition-for-rtp-10).
C. Perkins et al., "Multiplexing RTP Data and Control Packets on a Single Port", Internet Engineering Task Force (IETF), RFC 5761, Apr. 2010, 14 pages, (http://tools.ietf.org/html/rfc5761).
Communication, dated Feb. 11, 2011, from the British Intellectual Property Office, issued in counterpart British Application No. 1017500.8.
Comunication dated Jun. 28, 2011, from the British Intellectual Property Office, issued in the corresponding British Application No. 1017500.8.
I. Johansson et al., "Support for Reduced-Size Real-Time Transport Control Protocol (RTCP): Opportunities and Consequences", Network Working Group RFC 5506, Apr. 2009, 18 pages, (http://tools.ietf.org/html/rfc5506).
J. Ott et al., Extended RTP Profile for Real-time transport Control Protocol (RTCP)-Based Feedback (RTP/AVPF), Network Working Group RFC 4585,Jul. 2006, 52 pages, (http://tools.ietf.org/html/rfc4585).
J. Ott et al., "RTP Control Protocol (RTCP) Extensions for Single-Source Multicast Sessions with Unicast Feedback", Internet Engineering Task Force (IETF) RFC 5760, Feb. 2010, 67 pages, (http://tools.ietf.org/html/rfc5760).
J. Rey et al., "RTP Retransmission Payload Format", Network Working Group, RFC458, Jul. 2006, 36 pages, (http://tools.ietf.org/html/rfc4588).
Communication, dated Mar. 25, 2013, issued by the European Patent Office in counterpart European Patent Application No. 11181503.1.
Communication from the European Patent Office issued Apr. 14, 2014 in a counterpart European Application No. 11181503.1.

* cited by examiner

VALIDATION AND FAST CHANNEL CHANGE FOR BROADCAST SYSTEM

CROSS-REFERENCE TO RELATED PATENT APPLICATION

This application claims priority from UK Patent Application No. 1017500.8, filed on Oct. 15, 2010, in the UK Intellectual Property Office, the disclosure of which is incorporated herein in by reference.

BACKGROUND

1. Field

The present invention relates generally to a system comprising a broadcast channel and a data channel, and more specifically, but not exclusively, to a method and apparatus relating to validation and channel change in a digital video broadcast system using a broadcast channel and having a connection using a data channel.

2. Description of the Related Art

A terminal may be capable of receiving data services, for example video data services, using a broadcast channel such as a terrestrial, satellite or cable Digital Video Broadcasting (DVB) channel, and may also be capable of receiving data services such as Internet Protocol Television (IPTV) using a data channel, such as an internet connection through, for example, a telecommunication service, such as a fixed line or wireless link.

A validation process may typically be required to validate that a terminal is authorised to receive a data service before a terminal is enabled to receive the data service. Such validation processes are well developed for DVB services delivered using a broadcast channel.

In order to validate that a terminal is authorised to receive a data service using the data channel, a validation process may be used that is based on sending a token, using a data service over the broadcast channel, so that the token may only be received by terminals authorised to receive the data service using the broadcast channel. It may then be assumed that the terminal is also authorised to receive certain data services using the data channel, and this may be enabled as a result of the terminal sending a token that it has received using the broadcast channel to a server for a data service using the data channel. The server may then enable the terminal to receive the data service using the data channel if the token is identified as valid. Such a system has the disadvantage that the broadcast data service has to be modified to transmit the token, and equipment is required to generate the token.

A data service, and in particular a digital video service, may consist of a data stream that has designated access points, such as Random Access Points (RAP), from which it is possible to start receiving the data service. It may not be possible to start decoding the service starting from a point between the designated access points. For example, a designated access point may provide information necessary to decode a video frame, but between designated access points, only incremental information may be provided on the assumption that the frame has been received. As a result, for example when changing channels, there may be a delay before a channel can be decoded to provide a video signal.

It is an object of the invention to mitigate the problems with the prior art systems.

SUMMARY

In accordance with a first aspect of the present invention, there is provided a method of enabling transmission of a data service from a content server to a terminal using a data channel in a system in which at least part of the data service is transmitted to the terminal using a broadcast channel and in which the terminal has been enabled to receive at least part of the data service transmitted using the broadcast channel, the method comprising:

receiving, using the broadcast channel, first data comprising part of the data service;

processing said first data using a signature-generating algorithm to derive first signature data;

transmitting said first signature data using the data channel to the content server;

validating said first signature data by comparing said first signature data with a signature derived by processing data comprising part of the data service using a corresponding signature-generating algorithm; and enabling the terminal to access the data service using the data channel dependent on validation of the first signature data.

An advantage of processing said first data to derive first signature data is that a signature may be generated from part of the data service that has been provided for some other purpose avoiding the need for a broadcaster to insert a token into the data service. An advantage of using a signature-generating algorithm to derive the first signature data is that the algorithm may provide an additional level of security and/or may provide compression of the first data to reduce demands on capacity of the data channel. The signature-generating algorithm may, for example, be a secret or proprietary algorithm.

An advantage of validating said first signature data by comparing said first signature data with a signature derived by processing data comprising part of the data service using a corresponding signature-generating algorithm is that it may be verified that the signature was generated on the basis of data that the terminal is authorised to receive over the broadcast channel.

In an embodiment of the invention, the first data may comprise video data and/or audio data. This has an advantage that the first data is low level data that is subject to considerable variation and is difficult to predict, increasing security of the system. The low level data may vary between equivalent parts of the same source material that have been processed or compressed using different processes, for example the same frame of a given film may have different first data depending on the encoding algorithm used, increasing security.

In an embodiment of the invention, the method comprises identifying said first data with respect to elements defining a transport stream packet. This has an advantage that allowable start and end points of the first data may be defined, to limit the number of potentially valid signature data variations with which signature data should be compared in a validation process.

In an embodiment of the invention said first data comprises a Presentation Time Stamp.

In an embodiment of the invention, the method comprises identifying said first data with respect to elements defining teletext data.

In an embodiment of the invention, the method comprises identifying said first data with respect to elements defining subtitle data.

In an embodiment of the invention, said first data comprises signalling data.

In an embodiment of the invention, said first data comprises a title and/or synopsis string.

In an embodiment of the invention, the method comprises generating the title and/or synopsis string using an Application Programming Interface provided by the terminal. This has an advantage of providing additional security.

In an embodiment of the invention, the method comprises:
 downloading, using the data service, an application to the terminal; and
 using the application to generate at least part of said first data from data received using the broadcast channel.

This has an advantage of providing additional security since the sending of the application may be limited to being to terminals that may potentially be authorised to receive the data service.

In an embodiment of the invention, the method comprises downloading the application to the terminal using the broadcast channel.

In an embodiment of the invention, the method comprises sending a message from the content server to the receiver indicating which part of the data service comprises said first data.

In an embodiment of the invention, the method comprises:
 receiving a key from the server using the data channel at the receiver; and
 processing said first data using the key to produce the first signature.

This has an advantage of improving security since the sending of the key may be limited to being to terminals that may potentially be authorised to receive the data service.

In an embodiment of the invention, the signature-processing algorithm comprises an encryption algorithm.

In an embodiment of the invention, the signature-processing algorithm comprises a hash function.

In an embodiment of the invention, the signature-processing algorithm comprises an exclusive-or bitwise function.

In an embodiment of the invention, the signature-processing algorithm comprises a compression function.

In an embodiment of the invention, the method comprises:
 sending the first signature data to a validation server; and
 validating the first signature at the validation server by comparison with a plurality of signatures derived from data comprising part of the data service.

This has an advantage that a plurality of signatures may be cached at the validation server, so that a comparison with potentially valid tokens can be carried out as an efficient method of validation.

In an embodiment of the invention, each of said plurality of signatures is derived from a respective part of a transmitted data stream. So, for example, signatures may be derived from a transmitted data stream, each signature being derived using a different part of the data stream, since the delay in the broadcast channel to the terminal may not be accurately known.

In an embodiment of the invention, said first signature data comprises at least part of a message from the terminal to the content server requesting helper data to assist Fast Channel Change of the data service.

In an embodiment of the invention, the broadcast channel is provided by one of a terrestrial video broadcast system, a satellite video broadcast system and a cable broadcast system.

In accordance with a second aspect of the present invention, there is provided a terminal arranged to receive a data service transmitted from a content server using a data channel in a system in which at least part of the data service is transmitted to the terminal using a broadcast channel and in which the terminal has been enabled to receive at least part of the data service transmitted using the broadcast channel, the terminal being arranged to:
 receive, using the broadcast channel, first data comprising part of the data service;
 process said first data using a signature-generating algorithm to derive first signature data;
 transmit said first signature data using the data channel to the content server for validation by comparison with a signature derived by processing data comprising part of the data service using a corresponding signature-generating algorithm; and
 access the first data service dependent on validation of the first signature data.

In accordance with a third aspect of the present invention, there is provided apparatus arranged to enable transmission of a data service from the content server to a terminal using a data channel in a system in which at least part of the data service is transmitted to the terminal using a broadcast channel and in which the terminal has been enabled to receive at least part of the data service transmitted using the broadcast channel, the content server being arranged to:
 receive first signature data transmitted using the data channel from the terminal, said first signature data having been derived by processing, using a signature-generating algorithm, first data comprising part of the data service received by the terminal using the broadcast channel;
 validate said first signature data by comparing said first signature data with a signature derived by processing data comprising part of the data service using a corresponding signature-generating algorithm; and
 enable the terminal to access the first data service dependent on validation of the first signature data.

In accordance with a fourth aspect of the present invention, there is provided a method of assisting reception of a data stream at a terminal in a system in which at least part of the data stream is transmitted to the terminal using a broadcast channel, and in which the terminal is connected to a server using a data channel, the method comprising:
 selecting the data stream to be received via the broadcast channel;
 tuning a receiver at the terminal to be capable of receiving at least part of the data stream;
 sending a message from the terminal to the content server requesting helper data to assist reception of the data stream;
 receiving the helper data at the terminal via the data channel;
 using the helper data to assist reception of the data stream using the broadcast channel.

An advantage of receiving the helper data at the terminal via the data channel and using the helper data to assist reception of the data stream using the broadcast channel, is that the helper data may be provided without using bandwidth on the broadcast channel.

In an embodiment of the invention, the helper data assists reception of the data stream in an initial period preceding a designated access point in the data stream. This has an advantage that channel change may be faster since it may not be necessary to wait until the designated access point for the data stream to be received.

In an embodiment of the invention the data stream is a video data stream and the designated access point is a Random Access Point.

In an embodiment of the invention the method comprises using the helper data to assist provision of a video signal in said initial period. For example the helper data may comprise a low resolution version of the video data before the designated access point or the helper data may comprise missed parts of the video stream such as data sent at a previous designated access point.

In an embodiment of the invention, the method comprises using the broadcast signal to provide a video signal in a period following the initial period. The helper data may not be required to receive the data stream once a designated access point has been reached.

In an embodiment of the invention the server comprises a Fast Channel Change server.

In an embodiment of the invention the helper data is provided using a multicast protocol.

In an embodiment of the invention the helper data is provided using a unicast protocol.

In an embodiment of the invention the data stream is a Digital Video Broadcasting data stream.

In an embodiment of the invention the helper data is a Real-time Transport Protocol (RTP) burst.

In an embodiment of the invention the Real-Time Transport Protocol burst comprises a Random Access Point (RAP) data.

In accordance with a fifth aspect of the present invention, there is provided a terminal arranged to receive a data stream in a system in which at least part of the data stream is transmitted to the terminal using a broadcast channel, and in which the terminal is connected to a server using a data channel, the terminal being arranged to:

select the data stream to be received; tune a receiver at the terminal to be capable of receiving at least part of the data stream;

send a message to the content server requesting helper data to assist reception of the data stream;

receive the helper data via the data channel; using the helper data to assist reception of the data stream using the broadcast channel.

Further features and advantages of the invention will be apparent from the following description of preferred embodiments of the invention, which are given by way of example only.

DETAILED DESCRIPTION OF EXEMPLARY EMBODIMENTS

Figure 1:
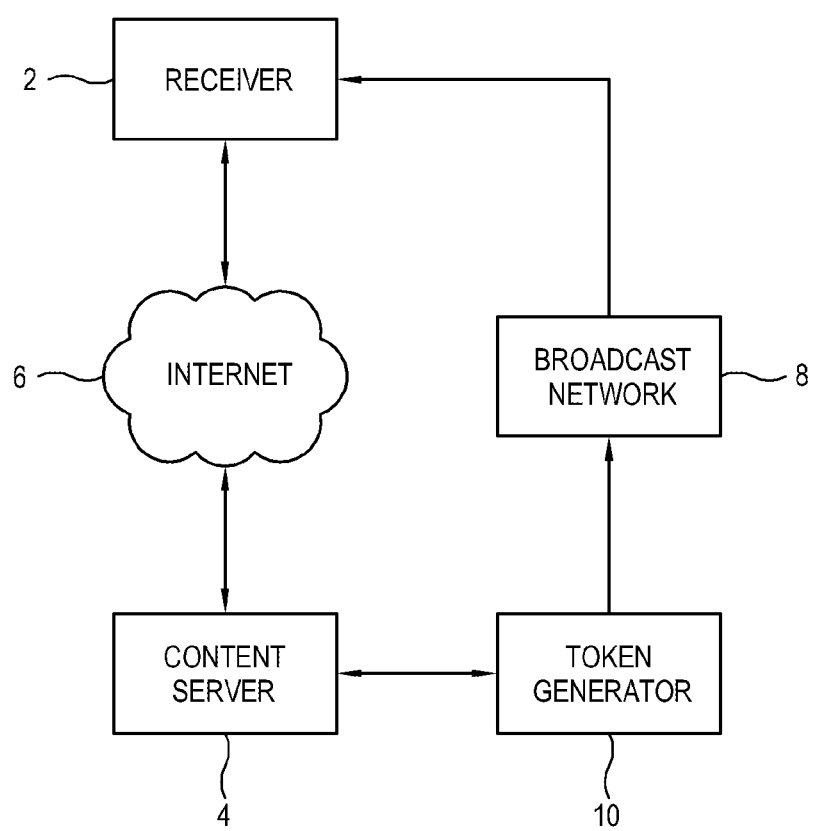
FIG. 1 is a schematic diagram illustrating a validation system according to the prior art.

By way of example, embodiments of the invention will now be described in the context of the transmission of a data service in a system comprising a terminal capable of receiving at least part of a data service using a broadcast channel such as may be provided by a terrestrial, satellite or cable digital video broadcast system and at least part of the data service, such as a Internet Protocol Television (IPTV) channel, using an Internet Protocol (IP) data channel. However, it will be understood that this is by way of example only and that other embodiments may involve other broadcast channels and data channels; embodiments are not limited to a digital video broadcast channel or a internet protocol data channel.

In a first embodiment of the invention, a terminal may be capable of receiving data services, for example video data services, by a broadcast channel such as terrestrial, satellite or cable Digital Video Broadcasting (DVB), and may also be capable of receiving data services such as Internet Protocol Television (IPTV) using a data channel, such as an internet connection through, for example, a telecommunication service such as a fixed line or wireless link.

The first embodiment concerns a validation process for validating that the terminal is authorised to receive a data service using the data channel before a terminal is enabled to receive the data service. It is assumed that the terminal has already been validated to receive at least parts of the data service using the broadcast channel, using, for example, a validation process for DVB services delivered using a broadcast channel, so that the terminal has been enabled to receive at least part of the data service transmitted using the broadcast channel. The terminal receives, using the broadcast channel, "first data" comprising part of the data service. The first data may take a variety of forms according to different embodiments of the invention. It may be what may be termed low level data such as video or audio data, or it may be other data, but it is typically data that is normally received on the broadcast channel by authorised terminals, that is terminals that are validated for the broadcast channel. Typically, the first data has been provided for some other purpose than validation, avoiding the need for a broadcaster to insert specific validation data into the data service. The reception of the first data indicates that the terminal is validated to receive the data service using the broadcast channel.

The first data is then processed using a signature-generating algorithm to derive first signature data and the first signature data is transmitted using the data channel to the content server.

Typically at the content server, the first signature data is validated by comparing the first signature data with a signature derived by processing data comprising part of the data service using a corresponding signature-generating algorithm, and the terminal is enabled to access the data service using the data channel dependent on validation of the first signature data.

Using a signature-generating algorithm to derive the first signature data may provide an additional level of security and/or may provide compression of the first data to reduce demands on capacity of the data channel. The signature-generating algorithm may, for example, be a secret or proprietary algorithm.

Validating the first signature data by comparing said first signature data with a signature derived by processing data comprising part of the data service using a corresponding signature-generating algorithm may verify that the signature was generated on the basis of data that the terminal is authorised to receive over the broadcast channel.

As has already been mentioned, the first data may comprise video data and/or audio data. This has an advantage that the first data is low level data that is subject to considerable variation and is difficult to predict, increasing security of the system. The low level data may vary between equivalent parts of the same source material that have been processed or compressed using different processes, for example the same frame of a given film may have different first data depending on the encoding algorithm used, increasing security.

The first data may be identified with respect to elements defining a transport stream packet. This has an advantage that allowable start and end points of the first data may be defined, to limit the number of potentially valid signature data variations with which signature data should be compared in a validation process.

In alternative embodiments, the first data may comprise a Presentation Time Stamp, teletext data, or subtitle data. The first data may also comprise signalling data, title and/or a synopsis string. The title and/or synopsis string may be generated using an Application Programming Interface provided by the terminal. This has an advantage of providing additional security.

An application may be downloaded, using the data service, to the terminal and used to generate at least part of the first data from data received using the broadcast channel. This has an advantage of providing additional security since the sending of the application may be limited to being to terminals that may potentially be authorised to receive the data service. The application may be downloaded to the terminal using the broadcast channel.

A message from the content server to the receiver indicating which part of the data service comprises said first data.

In an embodiment of the invention, the signature-processing algorithm comprises an encryption algorithm and a key may be received from the server using the data channel and first data may be processed using the encryption algorithm and the key to produce the first signature. This has an advantage of improving security since the sending of the key may be limited to being to terminals that may potentially be authorised to receive the data service.

Alternatively, the signature-processing algorithm may comprises a hash function, an exclusive-or bitwise function, or a compression function.

The first signature data may be sent to a validation server or forwarded to the validation server by the content server and first signature may be validated at the validation server by comparison with a series of signatures derived from data comprising part of the data service. This has an advantage that a series of signatures may be cached at the validation server, so that a comparison with potentially valid tokens can be carried out as an efficient method of validation.

Each of the series of signatures may be derived from a respective part of a transmitted data stream. So, for example, signatures may be derived from a transmitted data stream, each signature being derived using a different part of the data stream, since the delay in the broadcast channel to the terminal may not be accurately known.

In an embodiment of the invention, the first signature data comprises at least part of a message from the terminal to the content server requesting helper data to assist Fast Channel Change of the data service.

Another aspect of the invention relates to a method of enabling fast channel change on the broadcast channel, using the assistance of helper data provided by the data channel. A data stream, such as a TV channel, to be received via the broadcast channel is selected at a terminal, and a receiver is tuned in to the selected channel. A message is then sent from the terminal to the content server requesting helper data to assist reception of the data stream, or TV channel. Helper data is then received at the terminal via the data channel, and the helper data is used to assist reception of the data stream using the broadcast channel.

An advantage of receiving the helper data at the terminal via the data channel and using the helper data to assist reception of the data stream using the broadcast channel, is that the helper data may be provided without using bandwidth on the broadcast channel.

The helper data may assists reception of the data stream in an initial period preceding a designated access point in the data stream, such as a Random Access Point in a video data stream, so that channel change may be faster since it may not be necessary to wait until the designated access point for the data stream to be received. The helper data may be used to assist provision of a video signal in the initial period. For example the helper data may comprise a low resolution version of the video data before the designated access point or the helper data may comprise missed parts of the video stream such as data sent at a previous designated access point. The helper data may not be required to receive the data stream once a designated access point has been reached, and the broadcast signal may be used to provide a video signal in a period following the initial period.

The helper data may be a Real-time Transport Protocol (RTP) burst, and may be provided by a Fast Channel Change server, and may be provided using a multicast or unicast protocol.

The invention will now be described in more detail.

An embodiment of the invention relates to hybrid broadband/broadcast receivers. It allows applications running on the receiver to provide some information (signature) to the broadband server which can only be derived from the live broadcast stream.

Content owners may be concerned about the misuse of the content that provide to devices over the internet. They can use a full-blown DRM system to protect the content but this is costly to implement and maintain. In the case of premium content, like Hollywood movies, this type of protection may be necessary, however a lot of content can be satisfactorily protected using other less costly means.

FIG. 1 illustrates one known method for securing the data relies on detecting whether the receiver 2 is connected a broadcast feed, that is to say broadcast channel, as well as a broadband network, that is to say data channel. Typically this will rule out most PCs and game consoles but will include STBs and TVs which are broadband enabled. The method may be used to protect the content provided over the Internet to terrestrial and satellite receivers that relies on a server or token generator 10 generating a token at regular intervals and providing this token to the broadcast network or broadcaster 8 for inclusion in the broadcast stream. The application on the receiver 2 extracts this token and sends it, for example via the internet 6, to the content server 4, which can validate it with the original server 10.

The disadvantages of the method illustrated by figure include the following: a dedicated server is required which introduces a potential reliability issue with the system (if this server fails, no content can be played by any receiver); the token generation algorithm must be such that future tokens cannot be predicted, otherwise rogue receivers could "guess" the token without having a broadcast connection; and the token must be inserted into the data stream to be broadcast and sent over the broadcast network. This may be difficult for some broadcasters to do with their broadcast architecture.

An embodiment of the invention relates to a way to content protection without requiring a server to explicitly generate a token. It uses information already provided in the broadcast stream and which changes at regular intervals as input into a process that outputs a signature (it could be a number or a string of characters).

Figure 5:
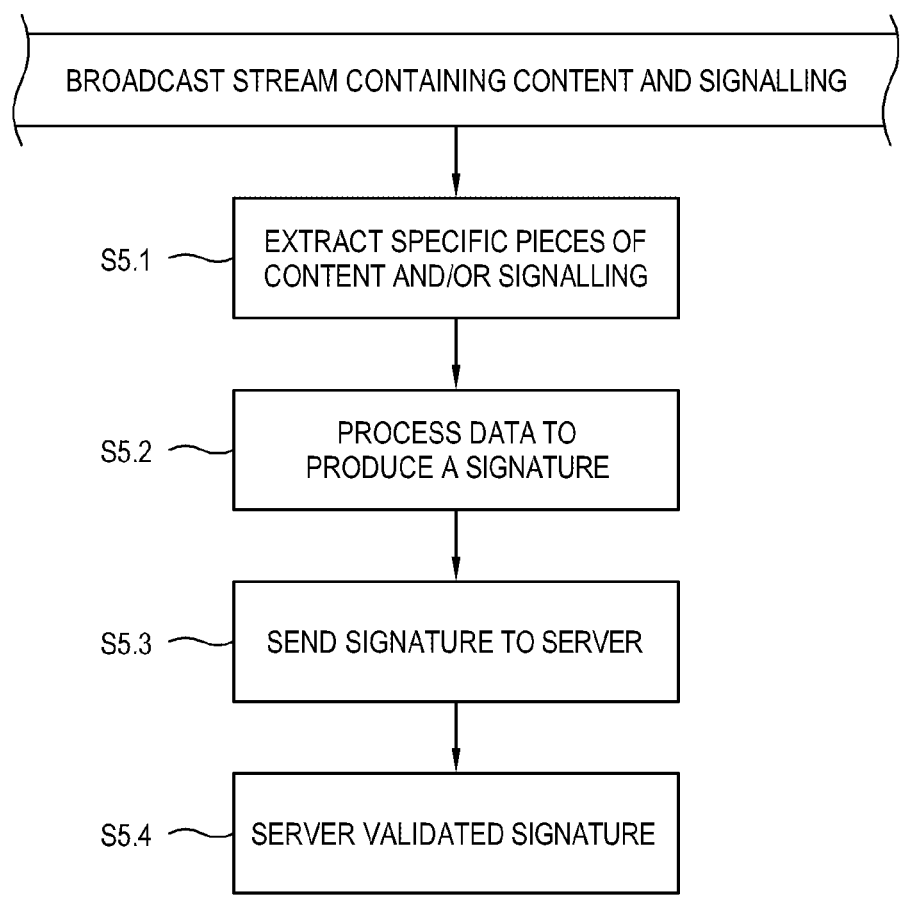
FIG. 5 is a flow diagram illustrating a validation process in an embodiment of the invention.

A validation process in an embodiment of the invention is illustrated by FIG. 5, comprising steps S5.1 to S5.4. When the receiver wishes to access content on a content server, it generates a new signature and provides it as part of the protocol sequence for accessing content on the content server. This process may be handled entirely by some low level native code in the receiver or it may be done completely in some high level code, possible an application downloaded from broadcast or broadband. Another option would be for the process to be done on a DVB CI CAM. Alternatively, the process may be split between any of these in some way.

Figure 4:
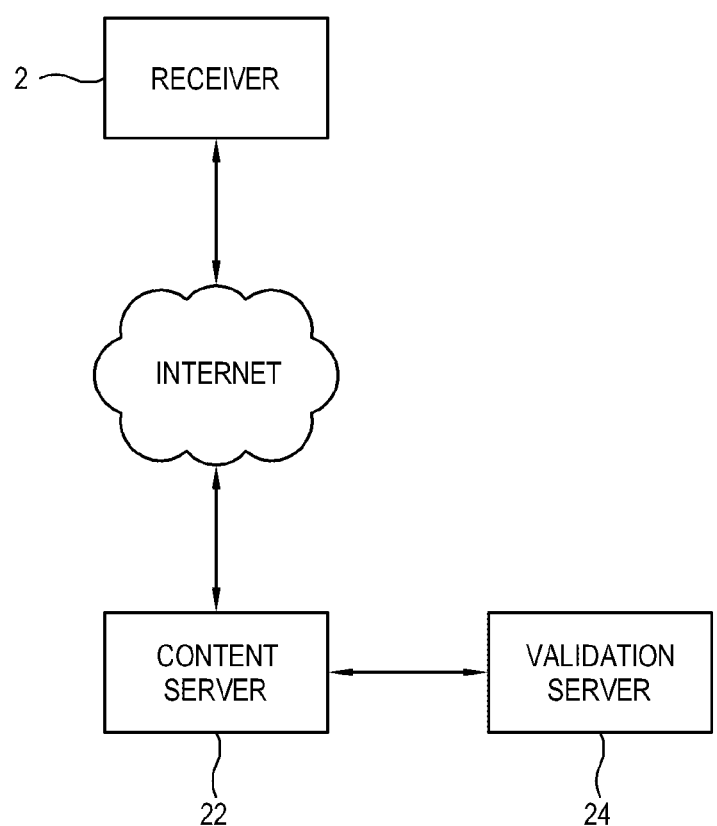
FIG. 4 is a schematic diagram illustrating a validation system in an embodiment of the invention.

As illustrated by FIG. 4, the content server 22 may pass the signature to a validation server 24 for checking before providing the content to the receiver 2. If the check is successful, the content server can know that the receiver is a type of device connected to the broadcast stream and the content owner can have some confidence that their content is protected.

The validation server may have access to the same data that is being broadcast, either by also receiving the broadcast stream itself or by some other means. It can therefore continually generate signatures using the same process as the one on the receiver and cache them for a short period of time (e.g. 10 seconds). When it receives a validation request from a receiver, it can check the signature provided by the receiver against those in its cache, looking for a match. If a match is found, the validation server can assume that the receiver does have access to the broadcast stream, and thus allow the receiver to have access to the content on the content server.

The process to generate the signature could be a simple copy operation, or it could be based on a well known algorithm, eg MD5, or it could require some patented technology. The advantage of the latter would be that the use of the process could be controlled by the patent owner and hence only implemented on devices that met other criteria, possibly around the protection of the content.

The content and signalling used to generate a "magic number" could use signalling such as the DVB EITp/f tables, the DVB TDT or TOT tables (all previous application level sources), Teletext data (perhaps specific pages) or subtitles (all previous middleware level source). It may be possible to use audio or video content data (low level source) although this will place a greater overhead on the server as it has to generate all possible magic numbers and cache them ready for a validation request.

The data (content and signalling) in a broadcast stream can be divided into three categories: high or application level data, such as the metadata carried in DVB EIT; medium or middleware level data, such as Teletext data or programme subtitles; and low level data, such as audio/video data or Transport Stream packets.

For some types of data, it may be useful for the start and/or end points of the data to be defined dynamically by the content server or validation server or pre-defined by some other means. For example, if Teletext data is used, the receiver would need to be told which Teletext page to use from the continuous Teletext stream. This could be part of the communication protocol between the content server and the receiver.

If the process to generate the signature is part of an application, it may only have access to high level data. However, if the process is deeply embedded in the receiver, it may have access to low level data. In some cases, data from more than one level could be combined in the process.

It may be more difficult for a rogue receiver to predict the contents of low level data compared with high level data. For instance, the contents of the EIT (the title, synopsis and similar information about the programme) may be obtained from other sources than the broadcast (not described here), however the contents of Transport Packets is likely to be unique and unpredictable.

Some static or pseudo-static data may also be used, as well as dynamic data from the broadcast stream. For example a device identifier or device certificate could be used which would ensure that every device generates a unique signature (preventing a third party from re-using the generated signature). Pseudo-static data could include an infrequently changed secret that is distributed in some way via the broadband or broadcast path In a first example of an embodiment of the invention, low level data is used as the "first data" which is processed to produce signature data. When a validation process is required, the receiver samples the broadcast stream and extracts a Transport Stream packet containing audio data for the currently tuned service. As part of the communication protocol with the content server, the content server provides a key, called the IV, to the receiver. The receiver passes the Transport Stream packet through an AES-128 CBC encryption process using the IV as the initialisation vector. The signature, which is the output of this process, is a 128 bit number. The receiver uses the communication protocol to send the signature to the content server. The content server requests the validation server to validate the signature. The validation server has a cache of the signatures of all of the audio Transport Packets, broadcast in the previous 10 seconds, after passing through the process described above. It checks the signature from the content server with the ones in its cache. An alternative would be to use the most recent PTS value received (as defined in ISO/IEC 13818-1) for the video stream for the currently tuned broadcast service, rather than a complete Transport Stream packet.

In a second example of an embodiment of the invention, medium level data is used as the "first data" which is processed to produce signature data. The receiver caches broadcast Teletext data. When a validation process is required, the receiver extracts from its cache the data for the Teletext page corresponding to the Teletext page number requested by the content server as part of the communication protocol. The receiver passes the Teletext data through an MD5 hash process to generate the signature. The receiver uses the communication protocol to send the signature to the content server. The content server requests the validation server to validate the signature. The validation server has a pre-generated the signature for the currently broadcast relevant Teletext page and possibly also has stored one or more signatures for previous versions of the Teletext page, depending upon how frequently the data on the Teletext page changes. It checks the signature from the content server with the ones in its cache.

In a third example of an embodiment of the invention, high level data is used as the "first data" which is processed to produce signature data. The receiver downloads and runs an application using the broadcast channel. The application uses the APIs provided by the receiver to access the title and synopsis for the currently received broadcast service. When a validation process is required, the application uses the communication protocol to receive a key from the content server. The application does an XOR bitwise operation on each byte of the concatenated title and synopsis strings to generate a signature. The application uses the communication protocol to send the signature to the content server. The content server requests the validation server to validate the signature. The validation server creates the signature based on the title, synopsis and key. It checks the signature that is has generated with the one from the content server.

Embodiments of the invention could also make use of a combination of different levels of data, in order to find a trade-off between anti-copying mechanism and complexity of the reconstruction of the signature.

An aspect of the invention relates to fast channel access. Broadcasting digital television signals over broadcast networks, such as terrestrial ones using for instance DVB-T or DVB-T2 standards, is a very popular way for a broadcaster to reach large audiences. Hence the cost of terrestrial bandwidth in which to broadcast such signals may be high. Broadcasters are therefore always looking for ways in which to minimize the amount of bandwidth that they require to broadcast their services.

Broadcast digital TV services are typically encoded using the DVB specifications. These specifications allow the broadcaster to trade off the quality of the encoding with the bandwidth required to broadcast the service.

One of the parameters that may be under the control of the broadcaster is the frequency of "random access points" (RAPs) in the video signal. The longer the time between RAPs generally results in less bandwidth required to encode the video signal, but the receiver is only able to start decoding the video signal at a RAP.

Figure 2:
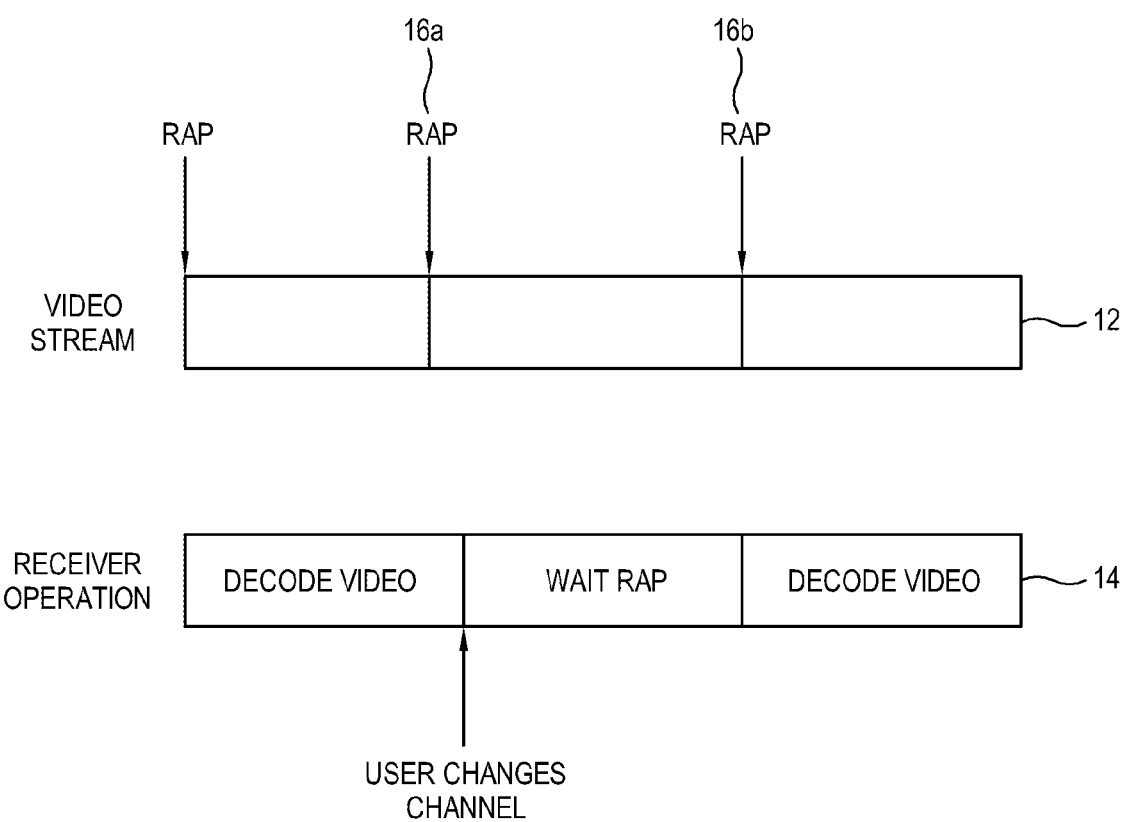
FIG. 2 is a schematic diagram illustrating a channel change process according to the prior art.

As illustrated by FIG. 2, when a receiver starts decoding the broadcast signal (perhaps after the user requests a channel change), the receiver waits for the RAP 16b in the video stream or signal 12. This means that the time taken by the receiver to perform a channel change is dependent upon the time between RAPs. 16a, 16b. This is a problem for all broadcast systems but gets worse as the broadcaster tries to reduce the bandwidth by increasing the time between RAPs.

The broadcaster may balance its own requirement to minimize bandwidth (reducing its costs but increasing the time between RAPs) with its desire to offer a good user experience with a short channel change time (increasing its costs but decreasing the time between RAPs).

Figure 3:
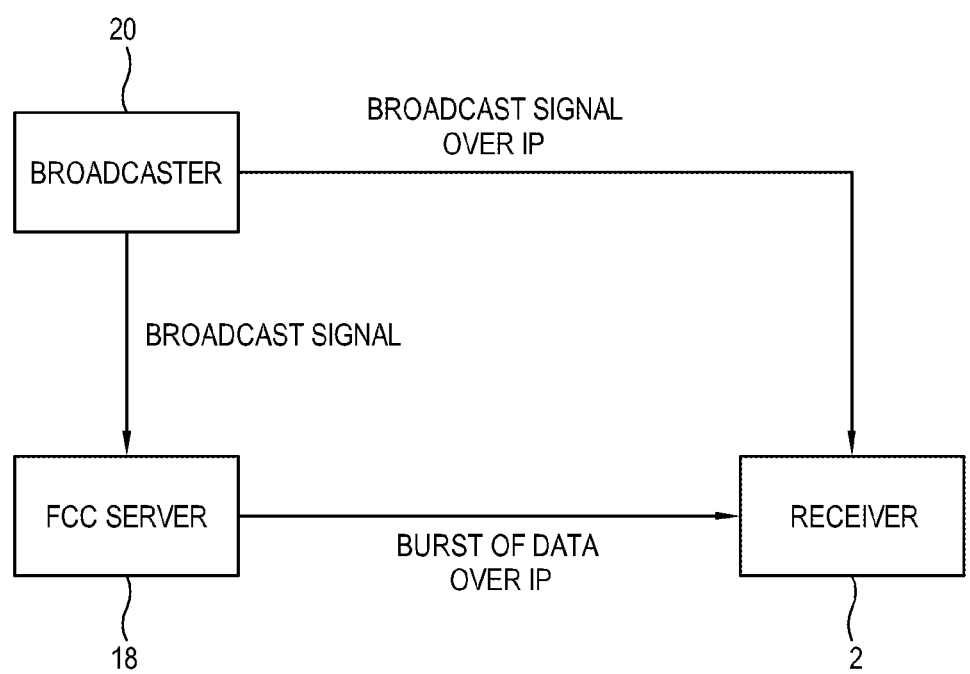
FIG. 3 is a schematic diagram showing assisted channel change according to the prior art.

FIG. 3 shows a prior art system to implement fast channel change. In this case, the digital TV signal is being sent to the receiver over an IP network. A server 18 can provide a burst of data to the receiver when it changes channel to enable it to start decoding the video signal immediately without having to wait for the occurrence of a RAP on the broadcast signal, resulting in a "fast channel change" (FCC). In this example, a broadcaster 20 may provide their digital TV signal over IP with Fast Channel Change (FCC) burst data also being provided over IP. The service discovery metadata provided by the broadcaster provides the details to allow a receiver to access both the broadcast signal over IP and the FCC burst data. It may not be possible to implement the same scheme on a non-IP broadcast system, as is typically found on DVB-T networks, as there is no bandwidth available for the FCC server to provide the burst of data. (If there were sufficient bandwidth, it would be more effective for the broadcaster just to increase the RAP frequency instead). Additionally, the signalling defined by DVB for broadcast networks does not include the required metadata for the receiver to access the FCC server An embodiment of the invention concerns a way for broadcasters to have a long time between RAPs (Random Access Points), to save broadcast bandwidth (and hence minimize their costs), at the expense of providing "helper" information over the internet to the receiver. The cost of transmitting data over the internet is progressively decreasing as capacity increases, whilst the cost of broadcasting is increasing as the demand for bandwidth increases and its availability comes under pressure from other users (e.g. mobile operators).

An embodiment of the invention also allows the "helper" information to be provided by a third party, for instance the ISP to whom the user is connected. This would allow the ISP to offer this functionality to its users as a service differentiator potentially at no cost to the broadcaster.

The information transmitted to the broadcaster to locate the helper information can also be used as the Token generator to prove that the content that it is connected to the broadcast network. In that way, the same server could be used to generate the token and the information to improve the RAPs time.

In an embodiment of the invention, the receiver has a broadcast signal input, typically a terrestrial one conforming to DVB-T or DVB-T2 specifications, and an interface allowing it to receive the burst of data using IP.

Figure 6:
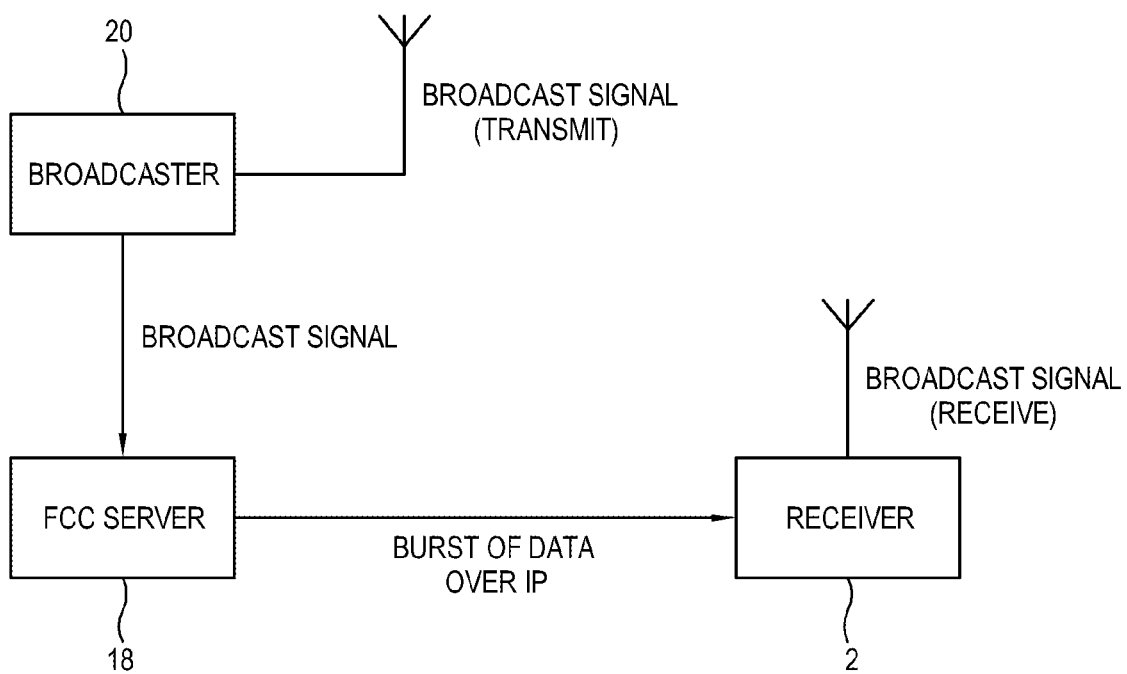
FIG. 6 is a schematic diagram illustrating assisted channel change in an embodiment of the invention.

As shown in FIG. 6, the FCC server 18 may be provided with the video signal directly by the broadcaster 20. It caches this temporarily to allow it to construct the burst of data that it provides to the receiver 2 on request. It may re-encode the video before providing it to the receiver to construct additional RAPs.

When the user requests the receiver to change channel, the following actions may occur: the receiver tunes to the new broadcast signal; the receiver contacts the FCC server and requests the burst of data; and the FCC server sends to the receiver the bust of data. The receiver may use this to start decoding the video signal immediately and displaying it to the user. The receiver extracts the required video signal from the broadcast signal. It starts decoding this video signal as soon as it has finished decoding the data from the FCC server.

In the case where the broadcaster is providing the FCC server, the broadcast signal must contain new metadata which signals the location of the FCC server on the internet. This may be in the form of a URI and any other appropriate metadata which is associated with the service, probably in a descriptor for that service or network in the Service Description Table and/or Network Information Table. This metadata transmitted by the broadcaster could also be used as the signature to generate the token, in combination with any other information previously described (low level, medium level and high level application).

If a third party is providing the FCC server, it may not be possible to broadcast this metadata so it would be provided over the internet. This may take the form of some metadata that would include a way to identify the broadcast signal and a URL with other appropriate metadata to signal the location and other properties of the FCC server. The burst data may be provided by the FCC server using a multicast (e.g. RTP/UDP) or a unicast protocol (e.g. HTTP). Further, the burst of data from the FCC server can be used at the same time as the signature.

Figure 7:
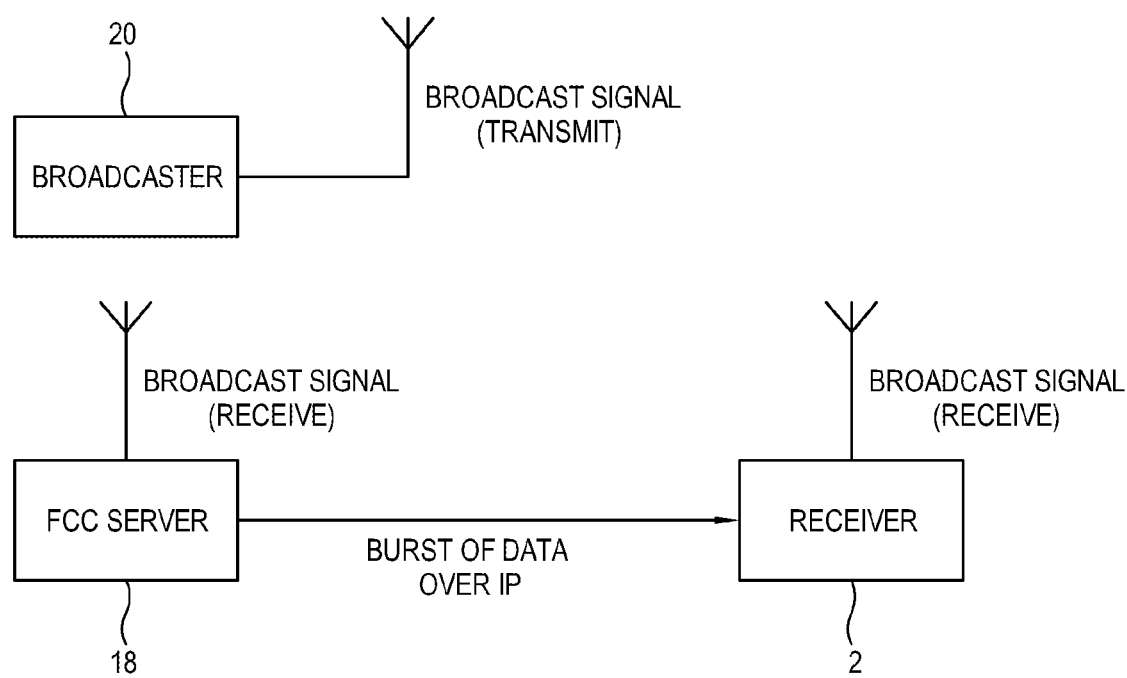
FIG. 7 is a schematic diagram illustrating assisted channel change in an alternative embodiment of the invention.

As illustrated by FIG. 7, the FCC server 18 could acquire the video signal from the broadcast signal itself and use this data to provide the burst of data to the receiver 2, instead of being given the data directly by the broadcaster 20.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of enabling transmission of a data service from a content server to a terminal using a data channel in a system in which at least part of the data service is transmitted to the terminal using a broadcast channel and in which the terminal has been enabled to receive at least part of the data service transmitted using the broadcast channel, the method comprising:

receiving, using the broadcast channel, first data comprising part of audio or video data of the data service;

processing said first data using a signature-generating algorithm to derive first signature data;

transmitting said first signature data using the data channel to the content server;

validating said first signature data by comparing said first signature data with a signature derived by processing data comprising part of audio or video data of the data service, using a corresponding signature-generating algorithm; and enabling the terminal to access the data service using the data channel dependent on validation of the first signature data.

2. A method according to claim 1, further comprising identifying said first data with respect to elements defining a transport stream packet.

3. A method according to claim 1, wherein said first data comprises a Presentation Time Stamp.

4. A method according to claim 1, further comprising identifying said first data with respect to elements defining teletext data.

5. A method according to claim 1, further comprising identifying said first data with respect to elements defining subtitle data.

6. A method according to claim 1, wherein said first data comprises signalling data.

7. A method according to claim 1, wherein said first data comprises a title and/or synopsis string.

8. A method according to claim 7, further comprising:
generating the title and/or synopsis string using an Application Programming Interface provided by the terminal.

9. A method according to claim 1, further comprising:
downloading, using the data service, an application to the terminal; and
using the application to generate at least part of said first data from data received using the broadcast channel.

10. A method according to claim 9, further comprising downloading the application to the terminal using the broadcast channel.

11. A method according to claim 1, further comprising sending a message from the content server to the receiver indicating which part of the data service comprises said first data.

12. A method according to claim 1, further comprising:
receiving a key from the server using the data channel at the receiver; and
processing said first data using the key to produce the first signature.

13. A method according to claim 1, wherein the signature-processing algorithm comprises an encryption algorithm.

14. A method according to claim 1, wherein the signature-processing algorithm comprises a hash function.

15. A method according to claim 1, wherein the signature-processing algorithm comprises an exclusive-or bitwise function.

16. A method according to claim 1, wherein the signature-processing algorithm comprises a compression function.

17. A method according to claim 1, further comprising:
sending the first signature data to a validation server; and
validating the first signature at the validation server by comparison with a plurality of signatures derived from data comprising part of the data service.

18. A method according to claim 17, wherein each of said plurality of signatures is derived from a respective part of a transmitted data stream.

19. A method according to claim 1, wherein said first signature data comprises at least part of a message from the terminal to the content server requesting helper data to assist Fast Channel Change of the data service.

20. A method according to claim 1, wherein the broadcast channel is provided by one of a terrestrial video broadcast system, a satellite video broadcast system and a cable broadcast system.

21. A terminal arranged to receive a data service transmitted from a content server using a data channel in a system in which at least part of the data service is transmitted to the terminal using a broadcast channel and in which the terminal has been enabled to receive at least part of the data service transmitted using the broadcast channel, the terminal being arranged to:

receive, using the broadcast channel, first data comprising part of audio or video data of the data service;

process said first data using a signature-generating algorithm to derive first signature data;

transmit said first signature data using the data channel to the content server for validation by comparison with a signature derived by processing data comprising part of audio or video data of the data service, using a corresponding signature-generating algorithm; and access the first data service dependent on validation of the first signature data.

22. Apparatus arranged to enable transmission of a data service from the content server to a terminal using a data channel in a system in which at least part of the data service is transmitted to the terminal using a broadcast channel and in which the terminal has been enabled to receive at least part of the data service transmitted using the broadcast channel, the content server being arranged to:

receive first signature data transmitted using the data channel from the terminal, said first signature data having been derived by processing, using a signature-generating algorithm, first data comprising part of audio or video data of the data service received by the terminal using the broadcast channel;

validate said first signature data by comparing said first signature data with a signature derived by processing data comprising part of audio or video data of the data service, using a corresponding signature-generating algorithm; and enable the terminal to access the first data service dependent on validation of the first signature data.

* * * * *